(12) United States Patent
Luo et al.

(10) Patent No.: US 6,538,078 B2
(45) Date of Patent: Mar. 25, 2003

(54) SUPPORTED CATALYST FOR ETHYLENE (CO)POLYMERIZATION, PREPARATION AND USE OF THE SAME

(75) Inventors: Hekuan Luo, Beijing (CN); Ruiguo Tang, Beijing (CN); Hua Yang, Beijing (CN); Qinfang Zhao, Beijing (CN)

(73) Assignees: China Petro-Chemical Corporation, Beijing (CN); Beijing Research Institute of Chemical Industry Sinopec, Beijing (CN)

( * ) Notice: Subject to any disclaimer, the term of this patent is extended or adjusted under 35 U.S.C. 154(b) by 104 days.

(21) Appl. No.: 09/740,831

(22) Filed: Dec. 21, 2000

(65) Prior Publication Data

US 2002/0120078 A1 Aug. 29, 2002

(51) Int. Cl.$^7$ .......................... C08F 4/42; C08F 110/02
(52) U.S. Cl. .................. 526/124.3; 526/88; 526/901; 526/124.2; 526/125.1; 526/352; 502/128; 502/115; 502/116; 502/118; 502/126; 502/127; 502/129
(58) Field of Search ............................ 526/352, 901, 526/88, 124.3, 124.2, 125.1; 502/128, 115, 116, 118, 126, 127, 129

(56) References Cited

U.S. PATENT DOCUMENTS

| 4,302,565 A | * | 11/1981 | Goeke et al. ................. 526/88 |
| 4,508,842 A | | 4/1985 | Beran et al. |
| 4,525,469 A | * | 6/1985 | Ueda et al. ................. 502/125 |
| 4,693,990 A | * | 9/1987 | Hiroyuki et al. ............ 502/116 |
| 4,892,853 A | | 1/1990 | Cann et al. |
| 5,079,204 A | * | 1/1992 | Lee .............................. 502/104 |
| 5,442,018 A | | 8/1995 | Cann et al. |

FOREIGN PATENT DOCUMENTS

| CN | 87107589 A | 5/1988 |
| CN | 1056107 A | 11/1991 |
| CN | 1189505 A | 8/1998 |
| EP | 286001 A1 | 10/1988 |
| EP | 1016676 | 7/2000 |

OTHER PUBLICATIONS

Kevin J. Cann (UCC) Polymer Material Science and Engineering, pages 106 and 107, (1991).

* cited by examiner

Primary Examiner—David W. Wu
Assistant Examiner—Ling-Siu Choi
(74) Attorney, Agent, or Firm—Birch, Stewart, Kolasch & Birch, LLP

(57) ABSTRACT

The present invention relates to a highly active titanium based supported catalyst suitable for olefin (co)polymerization, preparation and use of the same. The catalyst according to the present invention is obtained by supporting a titanium based catalyst component containing a halide promoter on spherical silica. The resultant catalyst is excellent in its particle morphology and flowability, has highly catalytic activity, has excellent hydrogen response and has superior comonomer incorporation, the polymer prepared by using such a catalyst has its particle morphology further improved.

17 Claims, No Drawings

SUPPORTED CATALYST FOR ETHYLENE (CO)POLYMERIZATION, PREPARATION AND USE OF THE SAME

FIELD OF THE INVENTION

The present invention relates to a highly active titanium based supported catalyst suitable for olefin (co) polymerization, in particular ethylene (co)polymerization by a gas phase process, preparation and use of the same.

BACKGROUND OF THE INVENTION

It is well known that halocarbons have been applied in vanadium based catalysts for olefin polymerization as activity promoters and there are a number of patents involving them. For example, the vanadium based catalysts developed by Union Carbide Corporation have been successfully utilized for the industrial production of polyethylene by a gas phase process, with the key point being the incorporation of halocarbons as activity promoters, resulting in an improvement in the activity of vanadium based catalysts by a factor of 4 to 10 times. Further, U.S. Pat. No. 4,508,842 and CN 87107589A disclose the use of $CFCl_3$ and the like as promoters; EP 286001 discloses the use of $CH_2Cl_2$ or $CF_2ClCFCl_2$ as promoters; and U.S. Pat. No. 4,892,853 discloses the use of hexachloropropane or octachloropropane as promoters. In particular, Chinese Patent Application Publication No. CN 1056107A discloses a vanadium based catalyst obtained by supporting a promoter by a chemical bond, wherein the promoter is chemically bonded with said catalyst by reacting a halogenated alcohol, together with hydroxyl groups on the surface of silica, with an organic aluminium compound, thus promoting the activity of the vanadium center.

By investigating the promotion effect of halocarbons on vanadium based catalysts, the researchers from Union Carbide Corporation found out that only $CH_2Cl_2$ could promote the activity of the titanium center, and most of halocarbons such as $CFCl_3$, $CHCl_3$, $CCl_4$ largely inhibit the titanium center and substantially decrease the catalytic activity [Polymer Material Science and Engineering, pp. 106–107 (1991)]. The synthesis for bimodal or broad molecular weight distribution (MWD) polyethylene by using titanium/vanadium bimetallic catalysts is also based on the substantially inhibiting effect of $CFCl_3$, $CHCl_3$ and the like on the titanium center[U.S. Pat. No. 5,442,018].

However, this is not always the case, as demonstrated by the catalysts disclosed in Chinese Patent Application Publication No. CN 1189505A. In said catalyst, halocarbons represented by general formula $R_aCX_{(4-a)}$ (wherein R represents hydrogen, unsubstituted or halogen-substituted alkyl groups having less than 6 carbon atoms, X represents fluorine, chlorine or bromine, and a represents an integer of less than 4) are used. In a suitable molar ratio of the halocarbons to titanium, the catalytic activity of conventional titanium-centered Ziegler-Natta catalysts can be improved by 50 to 100% when used in gas phase polymerization of ethylene. However, since halocarbons are separately added into the polymerization reactor, one obvious disadvantage is the additional step required for adding the halocarbons to the polymerization reactor with its attendant problems of inaccurate feed, mixing problems, contact with the other catalyst components, and the like. After extensive studies made by the present inventors, it has been found out that in the titanium based catalyst with silica as carrier material, the halide promoter according to the present invention becomes a molecularly structural component of the catalyst composition by chemically bonding to silica through chemical reaction between said promoter and hydroxyl groups on the surface of silica, and further, the amounts of the supported promoter can be controlled by regulating the temperature and time for heat-activating the carrier material. Therefore, it is unnecessary to externally add halocarbons into the polymerization reactor, in order to obtain the promotion effect from the halide, and thus the disadvantages associated with the prior arts can be overcome.

SUMMARY OF THE INVENTION

The object of the present invention is to provide a highly active titanium based supported catalyst suitable for ethylene (co)polymerization, which has overcome the disadvantages associated with the prior silica-supported titanium based catalyst and is obtained by supporting a halide promoter onto a carrier material. When the catalyst is used for ethylene polymerization, not only the catalytic activity is largely enhanced, but also the particle morphology of the resulting polymer is further improved and the bulk density is markedly increased.

Another object of the present invention is to provide a process for the preparation of the catalyst in accordance with the present invention.

Still another object of the present invention is to provide the use of the catalyst in accordance with the present invention for olefin (co)polymerization.

In its one aspect, the present invention provides a highly active titanium based supported catalyst suitable for ethylene (co)polymerization, comprising:

A. a supported catalyst component which is a titanium-containing active component supported on an inert carrier material, comprising at least one titanium compound, at least one magnesium compound, at least one halide promoter, at least one electron donor compound and at least one porous inert carrier material; and B. an alkyl aluminium cocatalyst.

In its second aspect, the present invention provides a process for preparing the supported catalyst component in accordance with the present invention, comprising dissolving the titanium compound and the magnesium compound mentioned above into an electron donor compound, thereby obtaining a mother liquor, and then supporting said compounds onto an inert carrier material by impregnation.

In its third aspect, the present invention relates to the use of the catalyst in accordance with the present invention for olefin (co)polymerization.

DETAILED DESCRIPTION OF THE INVENTION

In the catalyst component A as mentioned above, the magnesium compound, the electron donor compound, the titanium compound and the porous inert carrier material have been described in U.S. Pat. No. 4,302,565, which is incorporated herein by reference.

In the catalyst component A as mentioned above, the halide promoter is a class of compounds represented by general formula $F-R^1[R^2{}_bX_{(3-b)}]$, wherein;

F represents an oxygen-containing functional group which is reactive with the organoaluminium compound, the titanium compound or hydroxyl groups, such as aldehyde groups, acyl groups, hydroxyl groups and the like; $R^1$ represents a divalent $C_1-C_6$ aliphatic or aromatic group which is attached to oxygen atom in the functional group F; $R^2$ represents hydrogen, unsubstituted or halogen-substituted $C_1$–$C_6$ alkyl, $C_3$–$C_6$ cycloalkyl or $C_6$–$C_{10}$ aromatic groups, b is 0, 1 or 2, and X is F, Cl or Br.

When F represents hydroxyl groups, said promoter is a class of halogenated alcohols, specific compounds being 2,2,2-trichloroethanol, 2,2-dichloroethanol, 2-chloroethanol, 1,1,-dimethyl-2,2,2-trichloroethanol, 4-chlorobutanol, para-chloro-phenol, iso-chlorophenol, ortho-chlorophenol, 2-chlorocyclohexanol and the like, with 2,2,2-trichloroethanol, 2,2-dichloroethanol, 2-chloroethanol and 1,1-dimethyl-2,2,2-trichloroethanol being preferred.

When F represents acyl groups, said promoter is a class of halogenated acyl halide, suitable examples of such compounds being trichloroacetyl chloride, dichloroacetyl chloride, chloroacetyl chloride, o-chlorobenzoyl chloride and 2-chlorocyclohexyl carbonyl chloride, with trichloroacetyl chloride, dichloroacetyl chloride and chloroacetyl chloride being preferred.

In the catalyst component A as mentioned above, preferable titanium compounds are those represented by general formula $Ti(OR)_{4-n}X_n$, wherein R represents $C_1$–$C_{14}$ aliphatic hydrocarbon groups, X represents a group selected form the group consisting of F, Cl, Br and mixtures thereof and n is 0, 1 or 2. Suitable examples are selected from the group consisting of titanium tetrachloride, titanium trichloride, titanium tetrabromide, titanium tetraiodide, titanium tetrabutoxide, titanium tetraethoxide, triethoxy titanium chloride, diethoxy titanium dichloride, methoxy titanium trichloride, ethoxy titanium trichloride and mixtures thereof, with titanium tetrachloride, ethoxy titanium trichloride and the like being preferred.

The magnesium compound which can be used is preferably those represented by general formula $MgX_2$, wherein X represents a group selected from Cl, Br, I or mixtures thereof. Specific examples can be magnesium dichloride, magnesium dibromide, magnesium diiodide, with magnesium dichloride being perferred.

The electron donor (ED) compound which can be used is preferably selected from the group consisting of alkyl esters of aliphatic or aromatic carboxylic acids, aliphatic ethers, cyclic ethers and aliphatic ketones. Among them, alkyl esters of $C_1$–$C_4$ saturated aliphatic carboxylic acids, alkyl esters of $C_7$–$C_8$ aromatic carboxylic acids, $C_2$–$C_6$ aliphatic ethers, $C_3$–$C_4$ cyclic ethers, $C_3$–$C_6$ saturated aliphatic ketones are preferred. Most preferably are methyl formate, ethyl acetate, butyl acetate, diethyl ether, dihexyl ether, tetrahydrofuran (THF), acetone and methyl isobutyl ketone. These electron donor compounds can be used alone or in a mixture of two or more of them.

The carrier material is a solid, particulate porous material, which contains an amount of hydroxyl groups on its surface, with dehydrated silica being preferred. A suitable carrier material is particulate silica, characterized by an average particle diameter of 20–80 μm, a pore volume of 1.5–5 ml/g, a specific surface area of 230–350 m$^2$/g and an average pore diameter of 18–40 nm; most preferred silica is characterized by an average particle diameter of 50 μm, a pore volume of 1.6 ml/g and a specific surface area of 300 m$^2$/g.

In the titanium-containing catalyst component A in accordance with the present invention the magnesium compound, the electron donor compound and the halide promoter are used in amounts of 0.5 to 50 moles, preferably 1.5 to 5 moles; 0.5 to 50 moles, preferably 1 to 10 moles; and 0.1 to 50 moles, preferably 0.5 to 10 moles, per mole of the titanium compound, respectively.

The component B which can be used is an alkyl aluminium represented by formula $AlR_3$, wherein R can be same or different and represents $C_{1-8}$ alkyl groups, and one or two of the alkyl groups can be substituted with chlorine. Preferable examples are selected from the group consisted of $AlEt_3$, $Al(i-Bu)_3$, $Al(n-C_6H_{13})_3$, $Al(n-C_8H_{17})_3$, and $AlEt_2Cl$. The alkyl aluminium mentioned above can be used alone or in combination.

The catalyst component in accordance with the present invention is preferably prepared by a process comprising the steps of:

(1) activating a carrier material in a conventional manner, preferably dehydrating at a temperature of 600° C. for 4 hours;

(2) adding the. heat-activated carrier material into a lower alkane solvent, followed by addition of an alkyl aluminium compound, and then reacting the mixture for a period of time, followed by evaporating the solvent and drying, thereby obtaining a solid powder;

(3) dissolving a titanium compound and a magnesium compound in an electron donor compound to prepare a mother liquor, wherein the titanium compound is added into the electron donor compound before or after the addition of the magnesium compound, or both the titanium compound and the magnesium compound are added simultaneously;

(4) adding the carrier material activated in step (2) into the mother liquor from step (3) and reacting them for a period of time, followed by drying to remove excess solvent, i.e. the electron donor compound, thereby obtaining a solid material;

(5) suspending the solid material from step (4) in a lower alkane solvent and then reducing with one or more alkyl aluminium compounds, followed by drying, thereby obtaining the final catalyst component;

wherein said halide promoter is incorporated into the catalyst component A by i) adding during the treatment of the carrier material in said step (2), ii) adding during supporting the catalyst complex from said step (3) onto the carrier material and iii) adding during the reduction of the catalyst in said step (5).

The lower alkane solvents used in step (2) and step (5) can be $C_3$–$C_9$ alkanes, preferably $C_5$ and $C_6$ alkanes, such as isopentane, pentane, hexane and the like.

The alkyl aluminium compounds which can be used in step (2) and step (5) are preferably those represented by general formula $AlR'_mX_{3-m}$, wherein R' can be same or different and represents $C_1$–$C_8$ alkyl groups, X represents a halogen, m is an integer of 1 to 3. Preferable alkyl aluminium compounds are $AlEt_3$, $Al(n-C_6H_{13})_3$, $AlEt_2Cl$, and the like.

It should be particularly noted that the halide promoter in accordance with the present invention can be incorporated into the catalyst component A by any effective manner. For example, an excellent promotion effect can be achieved by adopting one of the following methods: i) adding during the treatment of the carrier material in said step (2), ii) adding during supporting the catalyst complex from said step (3) onto the carrier material and iii) adding during the reduction of the catalyst in said step (5).

The catalyst according to the present invention is suitable for ethylene homopolymerization and copolymerization of ethylene and α-olefins, with the α-olefins being olefins having 3–10 carbon atoms, such propylene, butene-1, hexane-1, 4-methylpentene-1, octane-1, and the like. The polymerization reaction can be carried out in an inert solvent by a slurry process or a gas phase process. The polymerization temperature can be ranged from 50° C. to 100° C. Since in the catalyst according to the present invention, the halide promoter is supported onto the catalyst carrier, the resulting catalyst are more suitable for gas phase polymerization of ethylene and can exhibit excellent properties.

In comparison with the prior art catalysts, the catalyst system for gas phase polymerization of ethylene according to the present invention is obtained by chemically bonding a halide promoter and is suitable for all titanium-centered Ziegler-Natta catalysts. In addition, the promoter can be incorporated into the catalyst component A by any effective manner. For example, an excellent promotion effect can be achieved by adopting one of the following methods: i) adding the promoter during the treatment of the carrier material in said step (2), ii) adding the promoter during supporting the catalyst complex from said step (3) onto the carrier material and iii) adding the promoter during the reduction of the catalyst in said step (5). More particularly, when 2,2,2-trichloroethanol or trichloroacetyl chloride is used as the promoter, excellent promotion effect can be achieved in a very small amount, for example, in a ratio of 2,2,2-trichloroethanol (or trichloroacetyl chloride)/Ti of 0.1–3. Therefore, the catalyst system according to the present invention is industrially valuable. Moreover, the catalyst system according to the present invention is particularly suitable for gas phase polymerization of ethylene, with a smooth polymerization kinetic curve, without blocking or adhering to the wall of the polymerization reactor. The polymers prepared by using the catalyst system according to the present invention have a density and a melt index which can be easily regulated. Finally, the catalyst system according to the present invention is excellent in comonomer incorporation and is particularly suitable for preparing LLDPE (linear low-density polyethylene).

EXAMPLES

The catalyst according to the present invention is described in more details by the following examples, but the catalyst system according to the present invention is not limited to them.

Example 1
Preparation of Catalyst Component (a):
(1) 11 g of SYLOPOL 948# spherical silica (available from Grace Corporation, USA) is weighed and then activated at a temperature of 600° C. for 4 hours.
(2) Under nitrogen, to a flask equipped with a stirrer and containing hexane(100 ml) as solvent are added the heat-activated silica from step (1) and 5 ml of a solution of $AlEt_3$ in hexane(1 mmol/ml) . The mixture is reacted at a temperature of 60° C. for half an hour, followed by slow drop-wise addition of 1.2 ml trichloroacetyl chloride. After the completion of addition, the mixture is reacted for half an hour and then is dried by sweeping with highly pure nitrogen, thereby obtaining flowable powders.
(3) To another flask equipped with a stirrer are added 11 g $MgCl_2$, 0.4 ml $TiCl_4$ and 100 ml tetrahydrofuran. The mixture is heated under stirring to reflux for 3 hours, thereby obtaining a catalyst mother liquor.
(4) The silica treated in step (2) is mixed with the catalyst mother liquor from step (3). The mixture is stirred under refluxing for 1.5 hours, followed by drying by sweeping with highly pure nitrogen, thereby obtaining flowable, pale yellow solid powders.
(5) The product from step (4) is prereduced in 100 ml hexane at a temperature of 60° C. by first drop adding 3.3 ml of a solution of $AlEt_2Cl$ in hexane (2.2 mmol), after the completion of addition, the mixture is reacted for half an hour, followed by drop adding 14 ml of a solution of $AlEt_3$ in hexane (1 mmol), after the completion of addition, the mixture is reacted for half an hour and then dried by sweeping with highly pure nitrogen, thereby obtaining powdery catalyst component. Ti, 0.74%.

Evaluation of the Catatlyst:

Slurry homopolymerization of ethylene: The slurry polymerization is carried out in a 2 liter stainless steel autoclave. The conditions are as follows, the catalyst component, 1.2 mg (in terms of Ti); $H_2/C_2H_4$=0.25/0.48 MPa; 1 ml of a solution of $AlEt_3$ in hexane (1 mmol/ml); hexane, 1 liter; 80° C.; 2 hours.

Results: smooth catalytic activity; activity, $1.61\times10^5$ gPE/gTi (1191.4 gPE/gcat); and bulk density of the polymer powders, 0.35 g/ml.

Example 2

The catalyst component (a) is prepared in a same manner as that in Example 1.

Evaluation of the Catalyst:

Gas phase homopolymerization of ethylene: Polymerization is carried out in a φ150 mm fluid bed for gas phase polymerization of ethylene, in the presence of 0.15 g catalyst, 35 mmol $AlEt_3$ and 600 g polyethylene powders as dispersant, under the following polymerization conditions: total pressure, 1.2 MPa; $H_2/C^-2$=0.20, temperature, 88° C., 4 hours, productivity, 4500 gPE/gcat, bulk density, 0.36 g/cm$^3$, density of the polymer, 0,960 g/cm$^3$.

Example 3

The catalyst component (a) is prepared in a same manner as that in Example 1.

Gas phase copolymerization of ethylene: Polymerization is carried out in a φ150 mm fluid bed for gas phase polymerization of ethylene, in the presence of 0.15 g catalyst from Example 1, 35 mmol $AlEt_3$ and 600 g polyethylene powders as dispersant, under the following polymerization conditions: total pressure, 1.2 MPa; butene-1 as a comonomer, $C^-_4/C^-_2$=0.063, $H_2/C^-_2$=0.20, temperature, 88° C., 4 hours, productivity, 8500 gPE/gcat, bulk density, 0.36 g/cm$^3$ density of the polymer, 0.926 g/cm$^3$.

Comparative Example 1

The catalyst component (a) is prepared in a same manner as that in Example 1 except that trichloroacetyl chloride is not added during the preparation.

The catalytic activity is evaluated in a same manner as that in Example 1.

Results: Ti, 0.69%; smooth catalytic acitivity; acitivity, $1.12\times10^5$ gPE/gTi (772.8 gPE/gcat); and bulk density of the polymer powders, 0.30 g/ml.

Comparative Example 2

The catalyst component (a) is prepared in a same manner as that in Comparative Example 1.

The catalytic activity is evaluated in a same manner as that in Example 2.

Results, activity, 3500 gPE/gcat; and bulk density, 0.35 g/cm$^3$.

Comparative Example 3

The catalyst component (a) is prepared in a same manner as that in Comparative Example 1.

The catalytic activity is evaluated in a same manner as that in Example 3.

Results: activity, 7000 gPE/gcat; and bulk density, 0.35 g/cm³.

Example 4

The catalyst component (a) is prepared in a same manner as that in Example 1 except that 1.2 ml trichloroacetyl chloride is added, followed by reacting the resulting mixture for half an hour and then adding 5 ml of a solution of AlEt₃ in hexane (1 mmol/ml).

The catalytic activity is evaluated in a same manner as that in Example 1.

Results: Ti, 0.93%; smooth catalytic activity; activity, 1.61×10⁵ gPE/gTi (1497.3 gPE/gcat); and bulk density of the polymer powders, 0.33 g/ml.

Example 5

The catalyst component (a) is prepared in a same manner as that in Example 1 except that 1.2 ml trichloroacetyl chloride is added after the reduction reaction, followed by reacting the resulting mixture for half an hour and then drying by sweeping with highly pure nitrogen.

Results: Ti, 0.87%; smooth catalytic acitivity; activity, 1.40×10⁵ gPE/gTi; and bulk density of the polymer powders, 0.31 g/ml.

Example 6

The catalyst component (a) is prepared in a same manner as that in Example 1 except that 0.7 ml 2,2,2-trichloroethanol is added, instead of 1.2 ml trichloroacetyl chloride.

The catalytic activity is evaluated in a same manner as that in Example 1.

Results: Ti, 0.80%; smooth catalytic acitivity; activity, 1.38×10⁵ gPE/gTi; and bulk density of the polymer powders, 0.32 g/ml.

Example 7–9

The catalyst component (a) is prepared in a same manner as that in Example 1 except that 0.7 ml 2,2,2-trichloroethanol is added after the reduction reaction, instead of 1.2 ml trichloroacetyl chloride, followed by reacting the resulting mixture for half an hour and then drying by sweeping with highly pure nitrogen. Ti, 0.93%.

Results: when carrying out the polymerization under different partial pressures of hydrogen, a smooth catalytic activity can be achieved and the polymerization results are listed in the following table:

| Example | Amount of catalyst added Ti (mg) | $H_2$ (MPa) | $C_2^=$ (MPa) | $C_6^=$ | Temperature (° C.) | Activity ($10^4$ gPE/gTi) | Bulk density (g/ml) |
|---|---|---|---|---|---|---|---|
| Ex. 7 | 1.2 | 0.25 | 0.48 | 0 | 80 | 12.0 | 0.31 |
| Ex. 8 | 1.2 | 0.25 | 0.48 | 12 ml | 80 | 18.7 | 0.33 |
| Ex. 9 | 0.6 | 0.25 | 0.75 | 0 | 80 | 41.0 | 0.33 |

Example 10

The catalyst component (a) is prepared in a same manner as that in Example 1 except that 0.7 ml 2,2,2-trichloroethanol is added immediately after the activated silica is mixed with the mother liquor, instead of 1.2 ml trichloroacetyl chloride, followed by reacting the resulting mixture for 1.5 hours and then drying by sweeping with highly pure nitrogen.

Results: Ti, 1.10%; smooth catalytic acitivity; activity, 1.56×10⁵ gPE/gTi; and bulk density of the polymer powders, 0.31 g/ml.

Example 11

The catalyst component (a) is prepared in a same manner as that in Example 1 except that 0.7 ml 2,2,2-trichloroethanol is added during the preparation of the mother liquor, instead of 1.2 ml trichloroacetyl chloride.

Results: Ti, 1.05%; smooth catalytic acitivity; activity, 1.45×10⁵ gPE/gTi; and bulk density of the polymer powders, 0.31 g/ml.

TABLE-1

Evaluation for slurry polymerization of catalysts

| Example | Promoter | Ti % | Activity ($10^4$ gPE/gTi) | Bulk Density (g/ml) | MI | FI | MFR |
|---|---|---|---|---|---|---|---|
| Ex. 1 | A | 0.74 | 16.1 | 0.35 | 0.95 | 29.6 | 31.1 |
| Comp. Ex. 1 | None | 0.69 | 11.2 | 0.30 | | | |
| Ex. 4 | A | 0.93 | 16.1 | 0.33 | | | |
| Ex. 5 | A | 0.87 | 14.0 | 0.31 | 0.86 | 26.6 | 30.9 |
| Ex. 6 | B | 0.80 | 13.8 | 0.32 | 0.52 | 15.93 | 30.6 |
| Ex. 7 | B | 0.93 | 12.0 | 0.31 | 0.28 | 6.96 | 24.9 |
| Ex. 10 | B | 1.10 | 15.6 | 0.31 | 0.88 | 26.2 | 29.8 |
| Ex. 11 | B | 1.05 | 14.5 | 0.31 | 1.12 | 34.7 | 31.0 |

Note:
A, $Cl_3CCOCl$;
B, $Cl_3CCH_2OH$.

TABLE-2

Evaluation for gas phase polymerizations

| Example | Promoter | Activity (gPE/gcat) | Bulk Density BD(g/ml) |
|---|---|---|---|
| Ex. 2 | B | 4500 | 0.36 |
| Comp. Ex. 2 | None | 3500 | 0.35 |
| Ex. 3 | B | 8500 | 0.36 |
| Comp. Ex. 3 | None | 7000 | 0.35 |

It can be seen from Table-1 that the solid catalyst component (a) prepared by using a promoter can evidently enhance the activity of the catalyst system and/or the bulk density of polyethylene. For example, the activity of the catalyst in Example 1, in which trichloroacetyl chloride is used as the promoter, is markedly improved, with the acitivity being enhanced from about 1.1×10⁵ gPE/gTi to about 1.6×10⁶ gP/gTi and the bulk density being increased from about 0.30 g/ml to about 0.35 g/ml.

What is claimed is:

1. A highly active titanium based supported catalyst for ethylene (co)polymerization, comprising:
   A) a supported catalyst component which is a titanium-containing active component supported on an inert carrier material, comprising at least one titanium compound, at least one magnesium compound, at least one halide promoter, at least one electron donor compound and at least one porous inert carrier material containing hydroxyl groups on its surface;
   said halide promoter has general formula $F—R^1[R^2{}_bX_{(3-b)}]$, wherein F represents an oxygen-containing functional group which is chemically bonded with alkyl aluminum cocatalyst of component B), the titanium compound or the hydroxyl groups of the carrier material; $R^1$ represents a divalent $C_1–C_6$ aliphatic or aromatic group which is attached to the functional group F; $R^2$ represents hydrogen, unsubstituted or halogen-substituted $C_1–C_6$ alkyl, $C_3–C_6$ cycloalkyl or $C_6–C_{10}$ aromatic groups, b is 0, 1 or 2, and X is fluorine, bromine or chorine;
   said magnesium compound being at least one selected from the group consisting of magnesium dichloride, magnesium dibromide, and magnesium diiodide; and
   B) the alkyl aluminum cocatalyst.

2. The catalyst according to claim 1, wherein said halide promoter is selected from the group consisting of 2, 2, 2-trichloroethanOl, 2, 2-dichloroethanol, 2-chloroethanol, 1,1-dimethyl-2, 2, 2-trichloroethanOl, 4-chlorobutanol, para-chlorophenol, iso-chlorophenol, ortho-chlorophenol and 2-chlorocyclohexanol.

3. The catalyst according to claim 1, wherein said halide promoter is selected from the group consisting of trichloroacetyl chloride, dichloroacetyl chloride, chloroacetyl chloride, α-chlorobenzoyl chloride and 2-chlorocyclohexyl carbonyl chloride.

4. The catalyst according to claim 1, wherein said titanium compound is selected from titanium tetrachloride, titanium trichloride, titanium tetrabromide, titanium tetraiodide, titanium tetrabutoxide, titanium tetraethoxide, triethoxy titanium chloride, diethoxy titanium dichloride, methoxy titanium trichloride, ethoxy titanium trichloride and mixtures thereof.

5. The catalyst according to claim 1, wherein said electron donor compound is selected from the group consisting of alkyl esters of $C_1–C_4$ saturated aliphatic carboxylic acids, alkyl esters of $C_7–C_8$ aromatic carboxylic acids, $C_2–C_6$ aliphatic ethers, $C_3–C_4$ cyclic ethers, $C_3–C_5$ saturated aliphatic ketones and mixtures thereof.

6. The catalyst according to claim 1, wherein in said catalyst component A, the magnesium compound, the electron donor compound and the halide promoter are used in amounts of 0.5 to 50 moles, 0.5 to 50 moles and 0.1 to 50 moles, per mole of the titanium compound, respectively.

7. The catalyst according to claim 1, wherein said component B is selected from the group consisting of $AlEt_3$, $Al(i-Bu)_3$, $Al(n-C_6H_{13})_3$, $Al(n-C_8H_{17})_3$, $AlEt_2Cl$ and mixtures thereof.

8. The catalyst according to claim 1, wherein the carrier material has an average particle diameter of about 20–80 μm and a pore volume of about 1.5–5 ml/g.

9. The catalyst according to claim 8, wherein the carrier material has a specific surface area of about 230–350 m²/g and an average pore diameter of about 18–40 nm.

10. The catalyst according to claim 1, wherein the carrier material has an average particle diameter of about 50 μm and a pore volume of about 1.6 ml/g.

11. The catalyst according to claim 10, wherein the carrier material has a specific surface area of about 300 m²/g and an average pore diameter of 18–40 nm.

12. The catalyst according to claim 1, wherein the carrier material is silica.

13. The catalyst according to claim 1, wherein F is at least one group selected from the group consisting of an aldehyde group, an acyl group, and a hydroxyl group.

14. The catalyst according to claim 1, wherein the electron donor compound is tetrahydrofuran.

15. A process for the preparation of the catalyst according to claim 1, comprising the steps of:
   (1) activating a carrier material;
   (2) adding the heat-activated carrier material into a lower alkane solvent, followed by addition of an alkyl aluminum compound, and then reacting the mixture for a period of time, followed by evaporating the solvent and drying, thereby obtaining a solid powder;
   (3) dissolving a titanium compound and a magnesium compound in an electron donor compound to prepare a mother liquor, wherein the titanium compound is added into the electron donor compound before or after the addition of the magnesium compound, or both the titanium compound and the magnesium compound are added simultaneously;
   (4) adding the carrier material activated in step (2) into the mother liquor from step (3) and reacting them for a period of time, followed by drying to remove excess electron donor compound, thereby obtaining a solid material;
   (5) suspending the solid material from step (4) in a lower alkane solvent and then reducing with one or more alkyl aluminum compounds, followed by drying, thereby obtaining the final catalyst component;
   wherein said halide promoter is incorporated into the catalyst component A by i) adding during the treatment of the carrier material in said step (2), ii) adding during supporting the catalyst complex from said step (3) onto the carrier material and iii) adding during the reduction of the catalyst in said step (5).

16. The process for the preparation of the catalyst according to claim 15, wherein the halide promoter is incorporated into the catalyst component A) by adding the halide promoter during the treatment of the carrier material in step 2.

17. A method for ethylene (co)polymerization, which comprises:
   catalyzing using the catalyst of claim 1 in a gas phase process or a slurry process.

* * * * *